United States Patent [19]

Hansen

[11] 4,116,282
[45] Sep. 26, 1978

[54] AGRICULTURAL IMPLEMENT WITH WING LIFT

[75] Inventor: Loren F. Hansen, Lincoln, Nebr.

[73] Assignee: Hiniker Company, Mankato, Minn.

[21] Appl. No.: 733,414

[22] Filed: Oct. 18, 1976

[51] Int. Cl.² ............................................. A01B 73/00
[52] U.S. Cl. ................................................... 172/311
[58] Field of Search .............. 172/126, 130, 131, 132, 172/231, 311, 456, 459, 491, 640, 662; 280/39, 411 R, 411 A, 413, 639, 651; 254/86 H, 124; 74/99 R, 101, 102, 103, 105; 214/130 R; 56/6, 7, 228, 385; 298/228

[56] References Cited

U.S. PATENT DOCUMENTS

| | | | |
|---|---|---|---|
| 1,889,520 | 11/1932 | Anthony | 298/22 B |
| 2,022,181 | 11/1935 | Brick | 298/22 B |
| 2,321,406 | 6/1943 | Merchant | 298/22 B |
| 2,581,662 | 1/1952 | Hutchinson | 254/124 X |
| 2,793,767 | 5/1957 | Smith et al. | 254/124 UX |
| 3,222,032 | 12/1965 | Schneider | 254/124 |
| 3,564,934 | 2/1971 | McMurtry | 74/105 |
| 3,667,631 | 6/1972 | Bishop | 254/124 X |
| 3,736,735 | 6/1973 | Kulak et al. | 56/6 X |
| 3,828,860 | 8/1974 | Poland | 172/311 |
| 3,941,194 | 3/1976 | Orthman | 172/456 X |
| 3,944,001 | 3/1976 | Warner et al. | 172/311 |
| 3,948,326 | 4/1976 | Harbert | 172/130 |
| 4,023,623 | 5/1977 | Anderson | 172/311 |

FOREIGN PATENT DOCUMENTS 747,719  4/1956  United Kingdom ..................... 254/124

OTHER PUBLICATIONS

"Mississippi Mulcher-Model PMR . . III", Poplarville Manufacturing Co., Poplarville, Miss., Jul. 1976.

*Primary Examiner*—Richard T. Stouffer
*Attorney, Agent, or Firm*—Merchant, Gould, Smith, Edell, Welter & Schmidt

[57] ABSTRACT

A mechanism including a linear hydraulic motor for displacing the wing of an agricultural field implement through 180 degrees about a horizontal axis so that it lies inverted on the body of this implement. A special feature of the mechanism is that the arrangement of the line of action of the hydraulic motor is never such, when in compression, as to lift a guiding roller for a wing actuating link off the upper surface of a cooperative short horizontal flat track. From the time the roller first engages the track to the time the roller has been displaced to the far side of the track, the force acting on the roller is directed downwardly. The roller is mounted on a pivoted arm and during this time, the pivot axis of the arm moves steadily upwardly.

1 Claim, 6 Drawing Figures

AGRICULTURAL IMPLEMENT WITH WING LIFT

BACKGROUND OF THE INVENTION

This invention relates to the field of agricultural implements, and particularly to such implements which are designed for being drawn by a large tractor and working a wide strip of land. Such implements must also be transported along public roads, and, if unmodified, would be so wide that such transport would be forbidden. Accordingly, it is known to construct these implements, by hinging or other means, to enable the width to be considerably reduced. An accepted way of doing this has been to divide the implement into a central body and terminal wings, the latter being hinged to the former so that they can be raised to a vertical position, thus reducing the implement width. This accomplishes the desired change in crosswise dimensions, but is not a very desirable arrangment from the point of view of stability.

SUMMARY OF THE INVENTION

The present invention comprises an implement having wings movable between first positions in which they comprise outward extensions of the central body, through substantially 180° to second positions, in which they lie inverted on a central body, the movement being accomplished by a simple linear hydraulic motor acting through a movable link with cooperating stop, roller, and track means which take into account the fact that the weight of the wing acts at different times on opposite sides of the pivotal axis, and hence requires sometimes compressional and sometimes tensional force from the motor.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION OF THE PREFERRED EMBODIMENT

Figure 1:
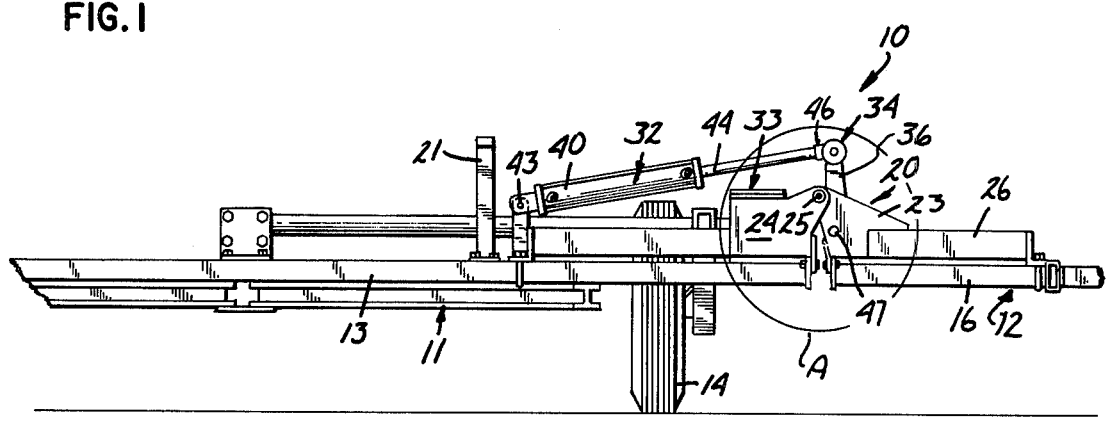
FIG. 1 is a fragmentary view in front elevation of a farm implement embodying my invention, conventional parts being omitted for clarity of illustration.

As shown in the drawing, a farm implement such as a field cultivator is shown at 10 to comprise a central body 11 and a wing 12. Body 11 comprises a frame 13 adapted to carry cultivator teeth or other appropriate tools, not shown, and is carried on wheels such as wheel 14 adjustably mounted for raising or lowering by any conventional manual or power means also not shown. Implement 10 is designed for being drawn behind a farm tractor by means of a draw bar 15. Wing 12 comprises a frame 16 which may also include a retractable wheel if desired: the wing is connected to body 11 by hinges 17 and 20, and is adapted to carry tools like body 11. It is understood that a wing may be hinged to body 11 at each end of frame 13.

It is further to be understood that the total width of frame 13, transverse to draw bar 15, may be 20 feet or more, and that each of the wings may be of up to half that dimension. In field use, the wings lie in a first position as horizontal extensions of the body: for transportation on roadways, the wings are hinged through substantially 180° to lie inverted on top of the body at its two ends, being received in suitable brackets carried by the frame of the body, such as bracket 21.

Figure 2:
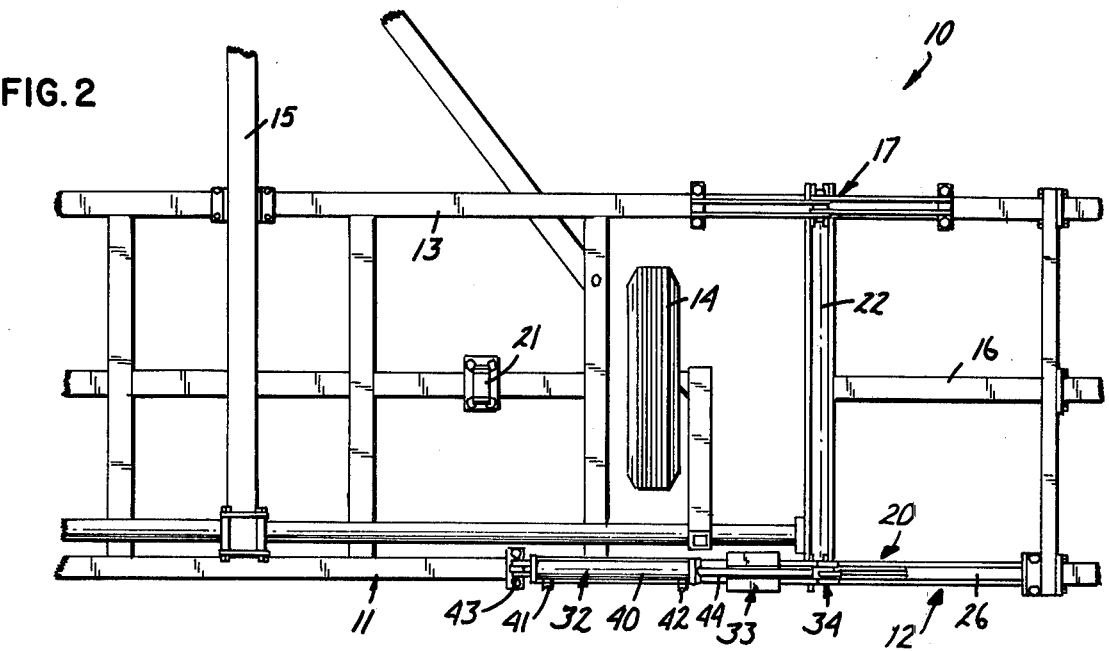
FIG. 2 is a plan view of the structure shown in FIG. 1.

Hinge 17 is of relatively straightforward construction, but hinge 20 is more intricate: the hinges are arranged to have a common horizontal axis indicated on FIG. 2 by the reference numeral 22. As shown in FIGS. 3-6, hinge 20 comprises a first hinge member 23 and a second hinge member 24. Although each member is composed of slightly spaced parallel plates, they may be considered in effect as flat members interconnected for relative pivotal movement through substantially 180° about a pin 25 lying on axis 22. For convenience, the plates may be welded to rectangular tubular members 26 and 27 for clamping or other securement to frames 16 and 13, respectively, at adjacent corners thereof. Reinforcing plates 30 and 31 may be provided if additional ruggedness is desired, and may be used in mounting members 26 and 27.

Much of the complexity of hinge 20 is due to the incorporation therein of elements for hydraulically displacing wing 12 between its first and second positions. These elements include a linear hydraulic motor 32, track means 33, roller means 34, stop means 35, and a link 36: these elements will now be described in detail.

Motor 32 comprises a cylinder 40 which has hydraulic connections 41 and 42 and is pivoted on a pin 43 at one end to the end of member 26 for movement about an axis parallel to axis 22. An actuator 44 extends from the end of cylinder 42 for reversible linear movement, and its outer end is pivotally connected to one end of link 36 by a pin 45 and a clevis 46, for movement about an axis parallel to axis 22. The other end of link 36 is pivoted to member 23 by a pin 47 for rotation about an axis parallel to but displaced from axis 22.

Stop means 35 is welded or otherwise secured between the plates of member 23, and is bored to pass pin 25. At a point in its rotation about pin 47, link 36 engages stop means 35 laterally at a location between pins 45 and 47. Stop means 35 preferably has at least one flat surface for direct impingement with an appreciable area of link 36.

Figure 3:
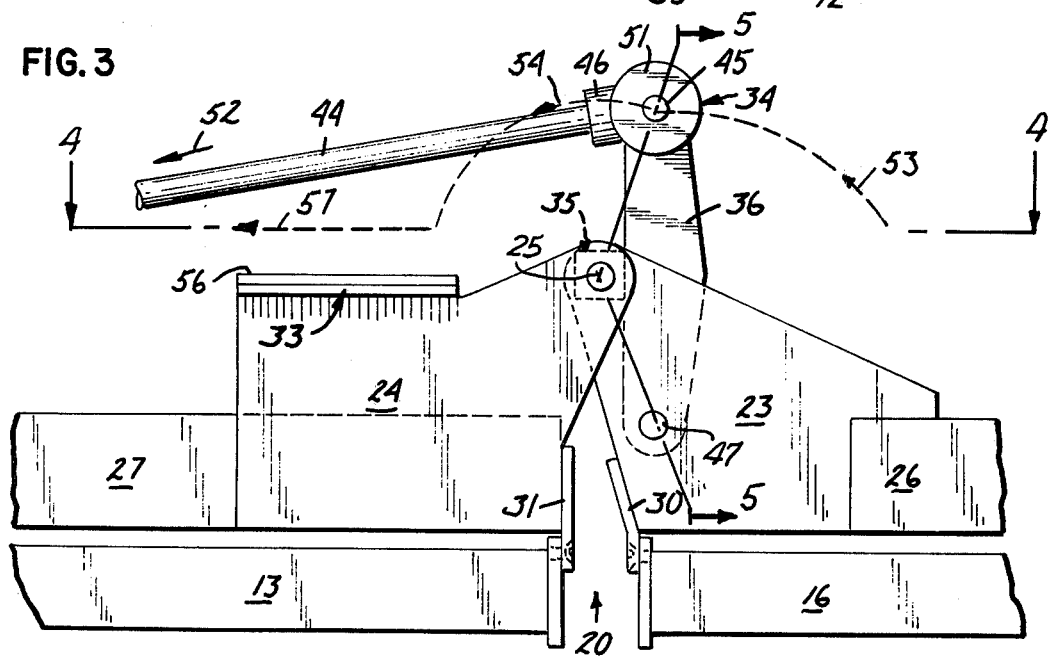
FIG. 3 is an enlarged fragmentary view of the portion of FIG. 1 identified by the circle A.

Roller means 34 comprises a pair of rollers 50 and 51 mounted for rotation about the axis of pin 45 and for movement with the end of link 36. The rollers are positioned axially outside of clevis 46. It will be understood, as shown in FIG. 3, that for motion of actuator 44 in the direction of arrow 52 the axis of roller means 34 initially follows the path indicated by arrow 53: when link 36 engages stop means 35 the path changes to that shown by arrow 54, link 36, hinge member 23, and wing 12 all pivoting about the axis 22 of pin 25.

Figure 6:
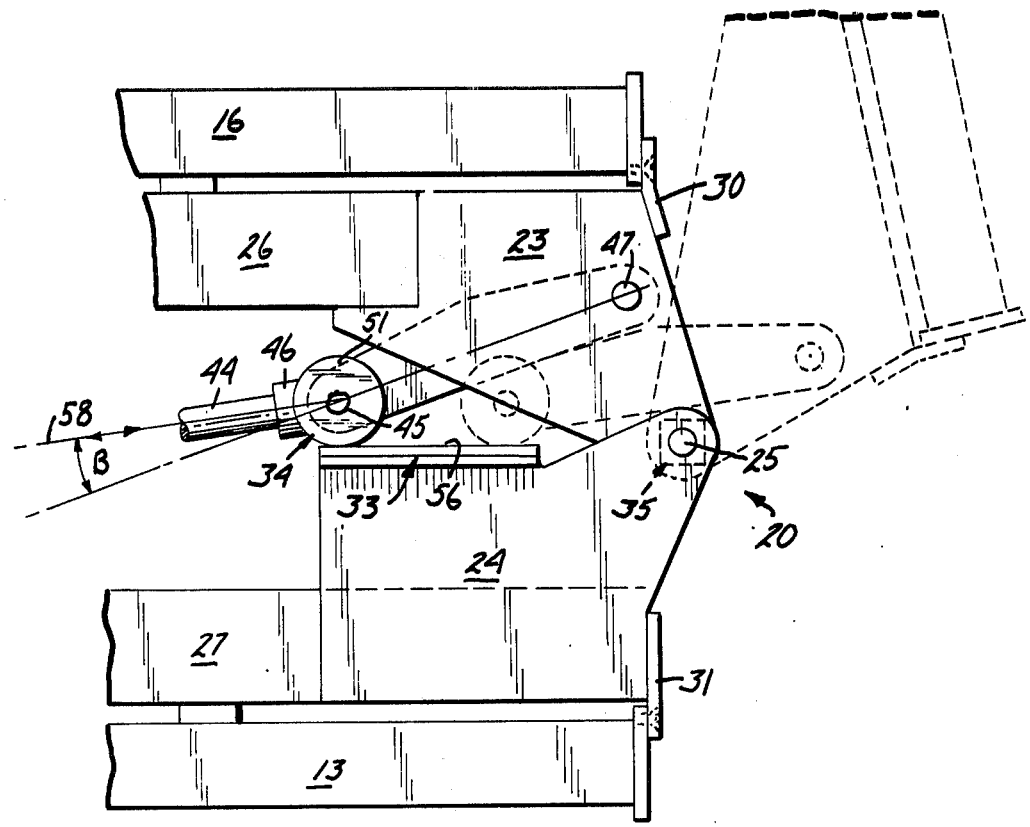
FIG. 6 is a view generally like FIG. 3 but showing the parts in two further positions relative to one another, one being shown in phantom.
Figure 4:
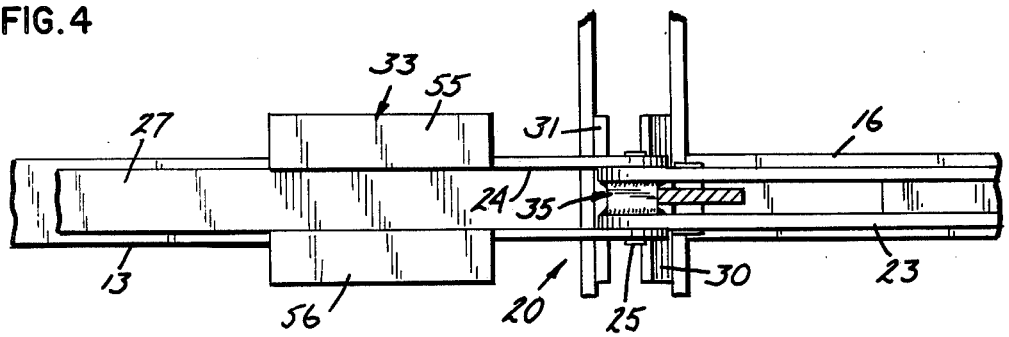
FIG. 4 is a sectional view along the line 4—4 of FIG. 3.
Figure 5:
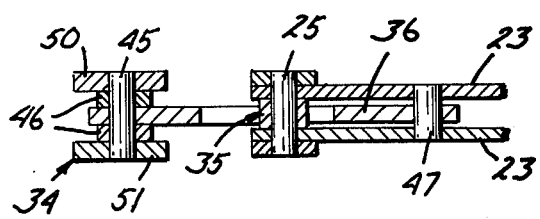
FIG. 5 is a sectional view along the line 5—5 of FIG. 3.

Track means 33 comprises a pair of tracks 55 and 56 which are formed as parts of or secured to hinge member 24. They are positioned for engagement by rollers 50, 51, respectively, and extend horizontally. With continued movement of actuator 44 in the direction of arrow 52, the rollers engage the tracks, and the path of the axis of the roller means changes to that shown by arrow 57. Rotation of hinge member 23 and wing 12 continues, but link 36 and stop means 35 move apart. This progression is illustrated in FIG. 6, where it is to be particularly noted that whenever rollers 50, 51 engage tracks 55 and 56, the line of action 58 of actuator 44 always passes between pins 25 and 47.

Hinge 17 may be made up of hinge members like members 23 and 24 except that track means 33 and the holes for pin 47 may be omitted.

The operation of my invention will now be clear. For road transportation, wings 12 lie inverted on body 11, resting on brackets 21: actuator 44 is withdrawn into cylinder 40 and roller means 34 is in engagement with track means 33 near the inward ends thereof. This is a stable, well supported position for the wings, and road transportation can be carried out at acceptable speed, the wheels 14 being lowered to raise the working tools above the road surface. See the solid showing of FIG. 6.

When the implement is brought onto a field to be worked, the wheels are lifted to the desired height, to permit tool operation. Hydraulic fluid is supplied to cylinder 40 and actuator 44 moves generally outward. Rollers 50, 51 move outward along tracks 55 and 56, and link 36 acts against pin 47 to rotate hinge member 23 and wing 12 closkwise about pin 25 to about the position showing in phantom in FIG. 6. When the weight of the wing moves past vertical, the force exerted on actuator 44 changes from one of compression to one of tension: at this point link 36 laterally engages stop means 35 so that the link acts as a lever of the second class, and further actuator motion allows the wing to complete its inversion (see FIG. 3) until it lies as an extension of body 11. Actuator operation is continued until the link 36 moves at least slightly away from stop means 35, to allow some movement between the wing and the body, whereby to accommodate changes in terrain. When the field work is completed, motor 40 is hydraulically energized to draw actuator 44 generally inward. Link 36 drawn into engagement with stop means 35 and the link, hinge member 23, and wing 12 all rotate counterclockwise about pin 25. At the point where the weight of the wing passes the vertical, rollers 50, 51 engage tracks 55, 56, the force on actuator 44 changes from tension to compression, and further hydraulic allows the rollers to move inward along the tracks to permit the hinge member and wing to pivot until wing inversion is completed: during this motion, displacement again occurs between stop means 35 and link 36. Now the wheels may be lowered and the implement by transported by road. Note that an appreciable sliding movement of link 36 on stop means 35 takes place in either of these operations.

While members 32–36 have been shown as integrated with hinge members 23 and 24 for convenience of manufacture, it will be appreciated that they can be mounted on frames 13 and 16 independently of the hinge members if this is thought desirable.

From the foregoing, it will be evident that I have invented an improved agricultural implement having new and more satisfactory apparatus for enabling the width of the implement to be shortened for road transportation and increased for efficient land working, including a new and improved mechanism for pivotally interconnecting portions of the implement to accomplish the desired result.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, expecially in matters of shape, size, and arrangement of parts, within the principle of the invention, to the full extent indicated by the broad general meaning of the terms in which the appended claims are expressed.

What is claimed is:

1. In a farm implement comprising a central body and a lateral wing hinged thereto for movement through substantially 180° about a first horizontal axis between a first position, in which said wing lies inverted upon said central body, and a second position, in which said wing lies as an extension of said body, the improvement which comprises:

a. a link having a first end pivotally connected to said wing for rotation about a second axis parallel to and displaced from said first axis,
  b. stop means carried by said wing for lateral engagement by said link at a location between its ends at a point in the pivotal movement of said link,
  c. roller means carried at the second end of said link for rotation about a third axis parallel to said first axis,
  d. a hydraulic cylinder, pivoted at one end to said body about a fourth axis parallel to said first axis and having an actuator pivoted at the other end to said second end of said link for rotation about said third axis, whereby to apply force, to said second end of said link along a line passing perpendicularly through said third axis, to first bring said link into engagement with said stop means and then cause rotation of said wing about said first axis,
  e. and horizontal plane track means carried by the central body, said track means spaced lower than said first axis and incurring only downward engagement by said roller means after said link engages said stop means, so that continued application of said force thereafter continues the rotation of said wing and causes rolling movement of said roller means along said track means, and simultaneously causes displacement between said stop means and said link,
  f. said first, second, third and fourth axes being so positioned with respect to each each other and with respect to said plane track means that whenever said wing moves from said second position to said first position, said roller means first makes contact with said plane track means adjacent one each thereof and is then displaced to the opposite end of said plane track means and that during such displacement, said second axis moves steadily away from the line of action of said actuator up to and including the time said wing reaches said first position, said second axis being on the opposite side of said line from said plane track means whenever said roller means engages said plane track means, whereby force acting in a vertical plane through the line of action of said actuator has no component away from the plane of said track.

* * * * *